(12) United States Patent
Yamada et al.

(10) Patent No.: US 7,576,739 B2
(45) Date of Patent: Aug. 18, 2009

(54) STORAGE MEDIUM HAVING GAME PROGRAM STORED THEREIN, AND GAME APPARATUS AND GAME PROCESSING METHOD THEREFOR

(75) Inventors: Yoichi Yamada, Kyoto (JP); Koji Kitagawa, Kyoto (JP); Shinko Takeshita, Kyoto (JP); Kazuaki Morita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 434 days.

(21) Appl. No.: 11/508,169

(22) Filed: Aug. 23, 2006

(65) Prior Publication Data

US 2007/0091083 A1    Apr. 26, 2007

(30) Foreign Application Priority Data

Oct. 26, 2005   (JP)   ............................ 2005-311024

(51) Int. Cl.
    *G06T 15/00*   (2006.01)
(52) U.S. Cl. ....................... 345/420; 345/625
(58) Field of Classification Search ................ 345/420, 345/619, 625; 446/236, 281, 378
    See application file for complete search history.

(56) References Cited

U.S. PATENT DOCUMENTS 5,848,926 A * 12/1998 Jardetzky et al. .............. 446/85

FOREIGN PATENT DOCUMENTS

JP    10-31410    2/1998

* cited by examiner

*Primary Examiner*—Phu K Nguyen
(74) *Attorney, Agent, or Firm*—Nixon & Vanderhye P.C.

(57) ABSTRACT

An area, in a virtual game world, for arranging a plurality of objects and a minimum allowed distance between objects to be arranged therein are set. A position of an object is changed for temporarily arranging the object to an arbitrary position in the area set in the virtual game world until arrangement of the object is finalized, and the distance between the temporarily arranged object and an object whose arrangement in the area is completed is calculated. When the calculated distance is equal to or greater than the minimum allowed distance, arrangement of the temporarily arranged object is finalized and a plurality of objects whose arrangement is finalized are displayed on a display screen.

18 Claims, 12 Drawing Sheets

F I G. 1 1
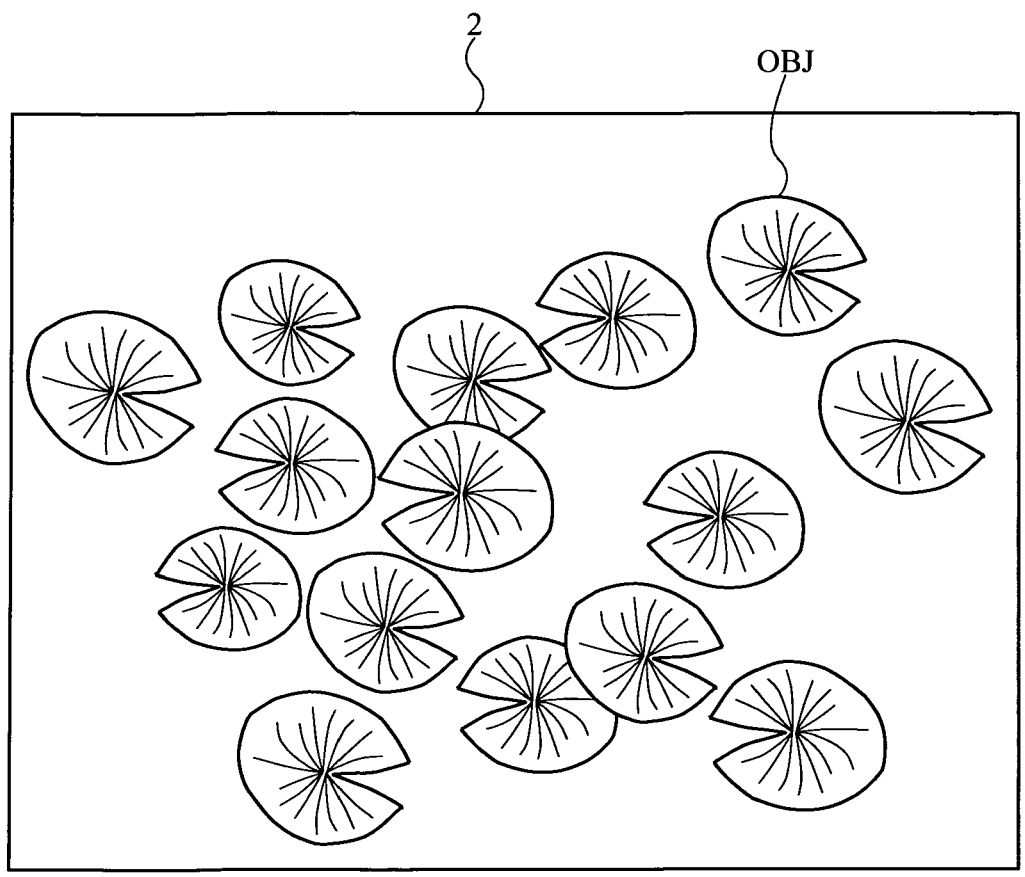

STORAGE MEDIUM HAVING GAME PROGRAM STORED THEREIN, AND GAME APPARATUS AND GAME PROCESSING METHOD THEREFOR

CROSS REFERENCE OF RELATED APPLICATION

The disclosure of Japanese Patent Application No. 2005-311024 is incorporated herein by reference.

BACKGROUND OF THE INVENTION

1. Field of the Invention

The present invention relates to a storage medium having a game program stored therein and a game apparatus and game processing method therefor. More specifically, the present invention relates to a storage medium having stored therein a game program for arranging a plurality of objects in a virtual game world and a game apparatus and game processing method therefor.

2. Description of the Background Art

Conventionally, an image closely representing a real world has been obtained by generating a game image in which a plurality of game objects are arranged in a virtual game world. When the real world in which a plurality of objects are randomly arranged is to be represented in a virtual world, a plurality of game objects representing the plurality of objects of the real world have to be arranged in random positions in order to make the virtual world seem real.

Japanese Laid-Open Patent Publication No. 10-31410 (herein after, referred to as "patent document 1") discloses an apparatus in which falling matters such as snow are represented in a virtual three dimensional space, for example. In the apparatus disclosed in patent document 1, a plurality of falling objects which are arranged in the three dimensional space are used to represent a plurality of real falling matters. The objects are then made to move downwardly while they are rotated in a predetermined rotation direction and by a predetermined rotation angle, so that a state of falling of a falling matter arranged in a respective falling object is depicted. Note that, in representing falling matters such as snow by using falling objects, types of falling matters used and their spatial arrangements may be made same for all falling objects so as to reduce a processing load, or spatial arrangements for the falling objects may be made different from each other.

However, in the real world, the distance between a plurality of matters randomly arranged differs depending on the likelihood of the matters to overlap each other or the like. In representing a real matter in a virtual game world, simply arranging a game object representing the matter in a random manner cannot yield a natural representation therefor. The likelihood of the matter to overlap with another has to be considered. For example, positions of a plurality of matters (e.g., fallen leaves around a deciduous tree) within a predetermined area of the ground in the real world are random and the matters frequently overlap each other. On the other hand, positions of a plurality of matters (e.g., floating weeds growing in crowds) which float within a predetermined area of a water surface are random but the matters less frequently overlap each other.

In the case of representing such a plurality of matters in a virtual game world, if a plurality of game objects representing the former type are randomly arranged in the virtual world but not in an overlapping manner, a player's experience feels unnatural. On the other hand, if a plurality of game objects representing the latter type are randomly arranged in the virtual world but in an overlapping manner, the player's experience feels unnatural. Also, for both of the former and latter types, if a plurality of game objects are arranged in fixed positions for which the likelihoods of the objects to overlap each other are considered, the player constantly views the game objects having a same arrangement relationship and therefore, the player's experience feels unnatural since the matters in reality exist in a random manner. In other words, by simply arranging game objects in a random manner without considering the likelihood of represented matters to overlap each other or arranging game objects in fixed positions with a consideration of the likelihood of represented matters to overlap each other, the player's experience feels unnatural in some cases.

SUMMARY OF THE INVENTION

Therefore, an embodiment of the present invention provides, when game objects are to be arranged in a virtual game world, a storage medium having stored therein a game program for arranging the game objects to positions close to the positions seen in reality, and a game apparatus and game processing method therefor.

Embodiments of the present invention may have one or more of the following features to attain the object mentioned above. Note that reference numerals or the like in parentheses show a corresponding relationship with the preferred embodiments to help understand the present invention, and are not in any way limiting the scope of the present invention.

A first aspect is directed to a storage medium having stored therein a game program executed in a computer (30) of a game apparatus (3) for displaying, on a display screen (2), a game image showing at least a portion of a virtual game world where a plurality of objects (OBJs) are presented. The game program causes the computer to execute an arrangement condition setting step (S51), an object temporary arrangement step (S57), a distance-between-objects calculation step (S58), an object arrangement finalization step (S59), and a display control step (S66). In the arrangement condition setting step, an area (A) for arranging the plurality of objects in the virtual game world and a minimum allowed distance (Lmin) between objects to be arranged therein are set. In the object temporary arrangement step, a position of an object is changed for temporarily arranging the object to an arbitrary position in the area set in the virtual game world until arrangement of the object is finalized. In the distance-between-objects calculation step, a distance (L) between the object temporarily arranged in the object temporary arrangement step and an object whose arrangement in the area is completed is calculated. In the object arrangement finalization step, the arrangement of the temporarily arranged object is finalized when the distance calculated in the distance-between-objects calculation step is equal to or greater than the minimum allowed distance. In the display control step, a plurality of objects whose arrangement is finalized in the object arrangement finalization step are displayed on the display screen.

In a second aspect based on the first aspect, a maximum number (Smax) for limiting a number of changes (S) performed, in the object temporary arrangement step, for a position of the object for temporarily arranging the object is further set in the arrangement condition setting step. In the object arrangement finalization step, when the number of temporary arrangements performed for the object in the object temporary arrangement step reaches the maximum number ("Yes" in S63), the arrangement of the temporarily arranged object is finalized even when the distance calculated in the distance-between-objects calculation step is smaller than the minimum allowed distance.

In a third aspect based on the first aspect, an arrangement number (Nmax) for limiting a number of objects to be arranged in the area is further set in the arrangement condition setting step. The game program causes the computer to repeatedly execute an arrangement process performed in the object temporary arrangement step, the distance-between-objects calculation step, and the object arrangement finalization step until a number (N) of objects whose arrangement is finalized in the object arrangement finalization step reaches the arrangement number.

In a fourth aspect based on the first aspect, a time limit (Tmax) for arranging the object in the area is further set in the arrangement condition setting step. The game program causes the computer to repeatedly execute an arrangement process performed in the object temporary arrangement step, the distance-between-objects calculation step, and the object arrangement finalization step until the time limit is reached.

In a fifth aspect based on the first aspect, the game program causes the computer to further execute an object selection step (S56). In the object selection step, each time an arrangement of an object is finalized, a next object (D31$a$, D32$a$, . . . , D3M$a$, . . . ) to be temporarily arranged in the object temporary arrangement step is selected from an object group (D1$g$) having a plurality of classified classes of objects.

In a sixth aspect based on the fifth aspect, an arrangement orientation (θ) of the selected object is arbitrarily set in the object selection step. In the object temporary arrangement step, the selected object (D31$c$, D32$c$, . . . , D3M$c$, . . . ) is temporarily arranged in accordance with the arrangement orientation.

A seventh aspect is directed to a game apparatus for displaying, on a display screen, a game image showing at least a portion of a virtual game world where a plurality of objects are presented. The game apparatus comprises arrangement condition setting means, object temporary arrangement means, distance-between-objects calculation means, object arrangement finalization means, and display control means. The arrangement condition setting means sets an area for arranging the plurality of objects in the virtual game world and a minimum allowed distance between objects to be arranged therein. The object temporary arrangement means changes a position of an object for temporarily arranging the object to an arbitrary position in the area set in the virtual game world until an arrangement of the object is finalized. The distance-between-objects calculation means calculates a distance between the object temporarily arranged by the object temporary arrangement means and an object whose arrangement in the area is completed. The object arrangement finalization means finalizes the arrangement of the temporarily arranged object when the distance calculated by the distance-between-objects calculation means is equal to or greater than the minimum allowed distance. The display control means displays, on the display screen, a plurality of objects whose arrangement is finalized by the object arrangement finalization means.

In an eighth aspect based on the seventh aspect, the arrangement condition setting means further sets a maximum number for limiting a number of changes performed, by the object temporary arrangement means, for a position of the object for temporarily arranging the object. The object arrangement finalization means finalizes, when a number of temporary arrangements performed for the object by the object temporary arrangement means reaches the maximum number, the arrangement of the temporarily arranged object is finalized even when the distance calculated in the distance-between-objects calculation means is smaller than the minimum allowed distance.

In a ninth aspect based on the seventh aspect, the arrangement condition setting means further sets an arrangement number for limiting a number of objects to be arrange in the area. The game apparatus repeatedly executes an arrangement process performed by the object temporary arrangement means, the distance-between-objects calculation means, and the object arrangement finalization means until a number of objects whose arrangements are finalized by the object arrangement finalization means reaches the arrangement number.

In a tenth aspect based on the seventh aspect, the arrangement condition setting means further sets a time limit for arranging the object in the area. The game apparatus repeatedly executes an arrangement process performed by the object temporary arrangement means, the distance-between-objects calculation means, and the object arrangement finalization means until the time limit is reached.

In an eleventh aspect based on the seventh aspect, the game apparatus further comprises an object selection means. Each time an arrangement of an object is finalized, the object selection means selects a next object to be temporarily arranged by the object temporary arrangement means from an object group having a plurality of classified classes of objects.

In an twelfth aspect based on the eleventh aspect, the object selection means arbitrarily sets an arrangement orientation of the selected object. The object temporary arrangement means temporarily arranges the selected object in accordance with the arrangement orientation.

A thirteenth aspect is directed to a game processing method for displaying, on a display screen, a game image showing at least a portion of a virtual game world where a plurality of objects are presented. The game processing method comprises an arrangement condition setting step, an object temporary arrangement step, a distance-between-objects calculation step, an object arrangement finalization step, and a display control step. In the arrangement condition setting step, an area for arranging the plurality of objects in the virtual game world and a minimum allowed distance between objects to be arranged therein are set. In the object temporary arrangement step, a position of an object is changed for temporarily arranging the object to an arbitrary position in the area set in the virtual game world until an arrangement of the object is finalized. In the distance-between-objects calculation step, a distance between the object temporarily arranged in the object temporary arrangement step and an object whose arrangement in the area is completed is calculated. In the object arrangement finalization step, the arrangement of the temporarily arranged object is finalized when the distance calculated in the distance-between-objects calculation step is equal to or greater than the minimum allowed distance. In the display control step, a plurality of objects whose arrangement is finalized in the object arrangement finalization step are displayed on the display screen.

In a fourteenth aspect based on the thirteenth aspect, a maximum number for limiting a number of changes performed, in the object temporary arrangement step, for a position of the object for temporarily arranging the object is further set in the arrangement condition setting step. In the object arrangement finalization step, when a number of temporary arrangements performed for the object in the object temporary arrangement step reaches the maximum number, the arrangement of the temporarily arranged object is finalized even when the distance calculated in the distance-between-objects calculation step is smaller than the minimum allowed distance.

In a fifteenth aspect based on the thirteenth aspect, an arrangement number for limiting a number of objects to be arranged in the area is further set in the arrangement condition setting step. An arrangement process performed in the object temporary arrangement step, the distance-between-objects calculation step, and the object arrangement finalization step is repeated until a number of objects whose arrangements are finalized in the object arrangement finalization step reaches the arrangement number.

In a sixteenth aspect based on the thirteenth aspect, a time limit for arranging the object in the area is further set in the arrangement condition setting step. An arrangement process performed in the object temporary arrangement step, the distance-between-objects calculation step, and the object arrangement finalization step is repeated until the time limit is reached.

In a seventeenth aspect based on the thirteenth aspect, an object selection step is further comprised. In the object selection step, each time an arrangement of an object is finalized, a next object to be temporarily arranged in the object temporary arrangement step is selected from an object group having a plurality of classified classes of objects.

In an eighteenth aspect based on the seventeenth aspect, an arrangement orientation for the selected object is arbitrarily set in the object selection step. In the object temporary arrangement step, the selected object is temporarily arranged in accordance with the arrangement orientation.

According to the first aspect, an object is arranged in a predetermined area in a virtual game world with reference to the distance between the object and another object; in addition, these objects are arranged to arbitrary positions in the predetermined area, whereby the objects can be randomly arranged in a well-balanced manner in the predetermined area. In other words, objects can be presented in a manner appropriate to a game and the objects are arranged in the predetermined area such that they appear natural, while following a rule that each of the objects is arranged in the predetermined area.

According to the second aspect, when an object cannot be temporarily arranged to a position separated from another object by equal to or greater than a minimum allowed distance after the object has been arranged a maximum number of times, the object is arranged to a position separated from the other object by a distance smaller than the minimum allowed distance, though a probability of this occurrence is relatively low. Accordingly, a plurality of objects can be randomly and naturally arranged. Also, through adjusting the maximum number for arrangement, it is possible to adjust a proportion of objects arranged to positions separated from another object by a distance smaller than the minimum allowed distance.

According to the third aspect, the number of objects to be arranged in an area set in a virtual game world can be adjusted.

According to the fourth aspect, a plurality of objects can be arranged in accordance with a time limit such as a display cycle in which a virtual game world is displayed to a display device, whereby a processing error due to a delay in an arrangement operation can be prevented.

According to the fifth aspect, even when a same type of object (e.g., a fallen leaf) is arranged, each object to be arranged can be selected from an object group having a plurality of classes (e.g., size being different), whereby it is possible to obtain a wide variation of objects to be arranged in a virtual game world, enabling a natural representation.

According to the sixth aspect, an orientation of an object is arbitrarily set with respect to each object to be arranged, whereby objects arranged in a virtual game world can be naturally represented.

Further, according to a game apparatus and a game processing method of one or more embodiments of the present invention, it is possible to obtain same effects obtained by the above-described storage medium having the game program stored therein.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is an example showing a plurality of objects OBJs being arranged to represent a state of floating weeds growing in clouds which are on a water surface such that only a few weeds overlap each other.

DESCRIPTION OF THE PREFERRED EMBODIMENTS

Figure 1:
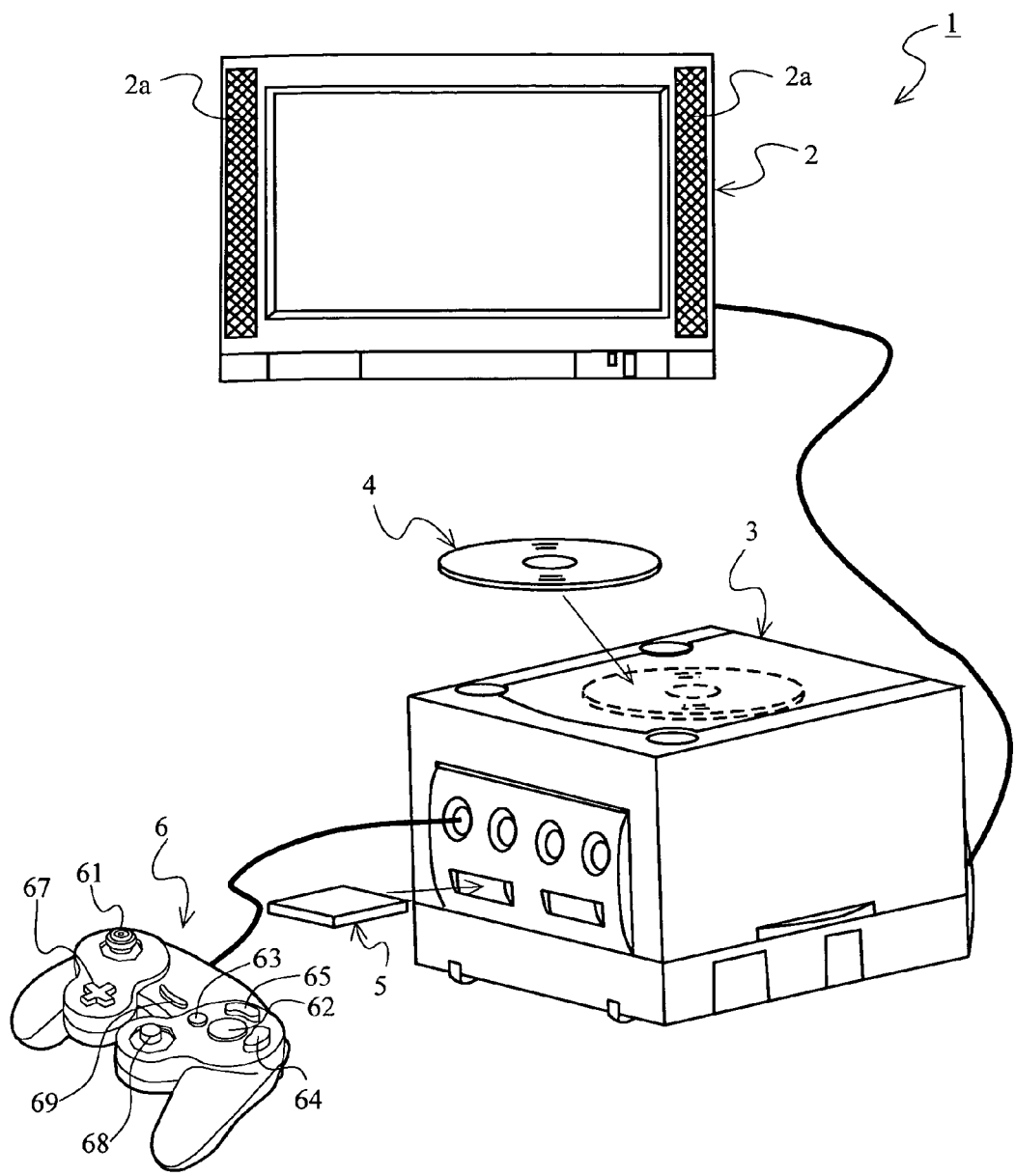
FIG. 1 is diagram showing an external view of a game system 1 according to a first embodiment of the present invention.

With reference to FIG. 1, a game system 1 according to an embodiment of the present invention is described. FIG. 1 is an external view of the game system 1 of FIG. 1. Hereinafter, a stationary game apparatus using the game system 1 of the present invention is used as an example.

In FIG. 1, the game system 1 is configured such that a CRT (Cathode Ray Tube) display (herein after, referred to as a "monitor") 2 having speakers 2a of a home-use television receiver or the like is connected to a stationary game apparatus (herein after, simply referred to as a "game apparatus") 3 via a connection code. The game apparatus 3 includes a controller 6 and an optical disk 4, the controller 6 being connected to the game apparatus 3 via a connection code and the optical disk 4, as an example of an information storage medium, being exchangeably used with respect to the game apparatus 3. Also, an external memory card 5 is detachably attached to the game apparatus 3, as necessary. The external memory card 5 has a backup memory or the like mounted thereon for fixedly storing save data or the like. The game apparatus 3 executes a game program stored in an optical disk 4 and displays the result on the monitor 2 as a game image. Also, the game apparatus 3 can reproduce a state of a game played in the past using save data stored in the external memory card 5 and display the game image on the monitor 2. A player playing with the game apparatus 3 can enjoy the game by operating the controller 6 while watching a game image displayed on the monitor 2. When a plurality of players play a game together, they respectively operate a plurality of controllers 6 while watching a game image displayed on the monitor 2, so that they can enjoy the game.

As described above, the controller 6 is connected to the game apparatus 3 via the connection code. The connection code is detachable to the game apparatus 3. The controller 6 is a means to operate a player object appearing in a game space displayed mainly on the monitor 2 and includes a plurality of operation buttons, keys, and input sections for a stick and the like. Specifically, the controller 6 is formed with grip sections to be gripped by each hand of a player. Additionally, the controller 6 includes a main stick 61 and a cross key 67, a C stick 68, an A button 62, a B button 63, an X button 64, a Y button 65, and a start-pause button 69, the cross key 67 being operable by the thumb or the like of the left hand of the player and the Y button 65 being operable by the thumb or the like of the right hand of the player. Further additionally, the controller 6 includes an R button 66a and an L button 66b respectively operable by the left and right index fingers of the player. Note that although these input sections are used in accordance with a progress of a game later described, a detailed description therefor is omitted since the input sections are not directly involved with the description of the present invention.

The optical disk 4 stores a game program which is a group of instructions and a group of data in a format executable by a computer, especially by a CPU 30 (described later), of the game apparatus 3. This game program is appropriately read into a main memory 33 for execution. In the below description, described is an example of executing a game program stored in the optical disk 4.

Figure 2:
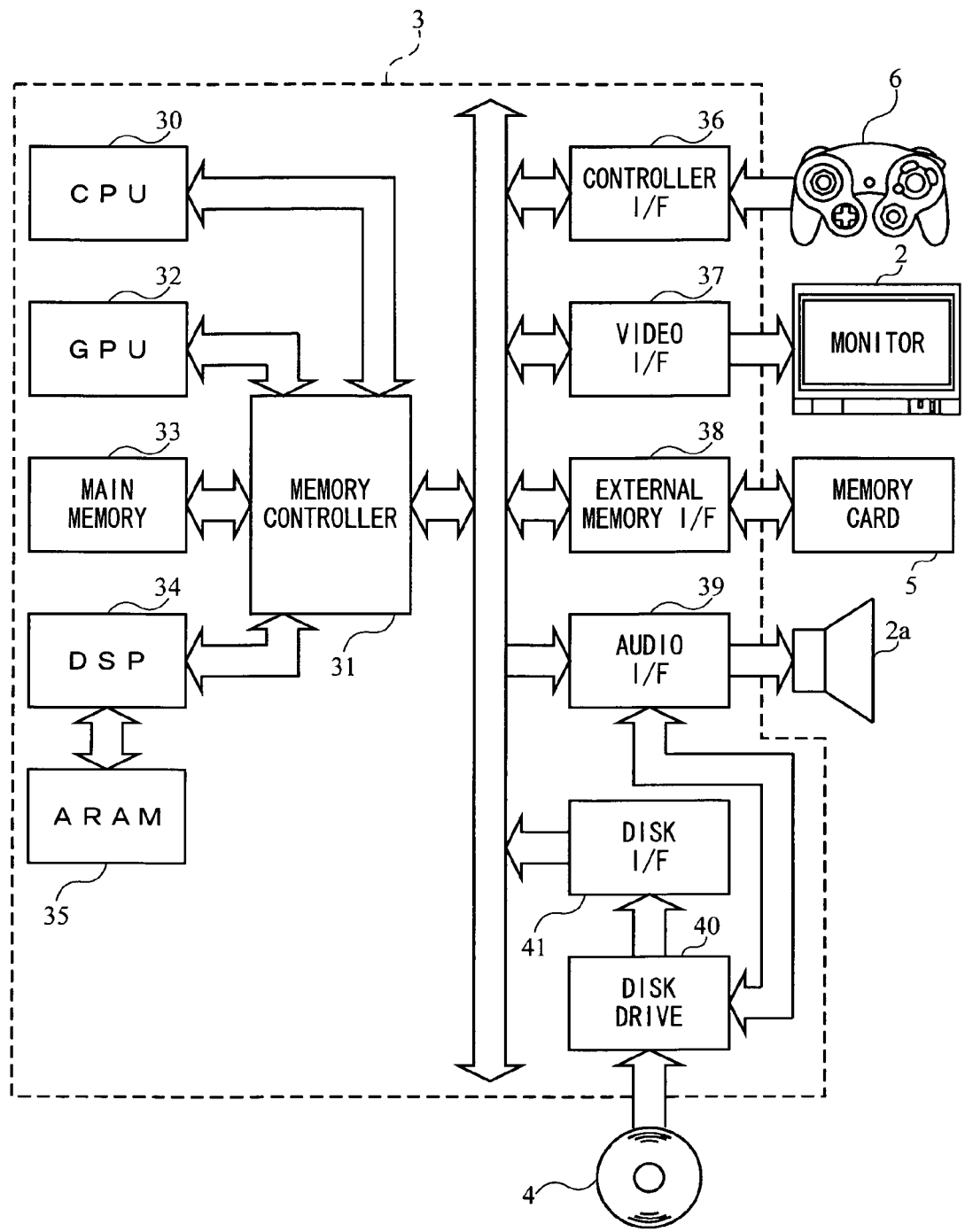
FIG. 2 is a functional block diagram of a game apparatus 3 of FIG. 1.

Next, with reference to FIG. 2, a configuration of the game apparatus 3 is described. FIG. 2 is a functional block diagram of the game apparatus 3.

As shown in FIG. 2, the game apparatus 3 includes, for example, a risk (RISC) CPU (central processing unit) 30 for executing various types of programs. The CPU 30 executes a start program stored in a boot ROM not shown to, for example, initializes memories including the main memory 33, and then executes a game program stored in the optical disk 4 for performing a game process in accordance with the game program. To the CPU 30, a GPU (Graphics Processing Unit) 32, the main memory 33, a DSP (Digital Signal Processor) 34, and an ARAM (Audio RAM) 35 are connected via a memory controller 31. To the memory controller 31, a controller I/F (interface) 36, a video I/F 37, an external memory I/F 38, an audio I/F 39, and a disk I/F 41 are connected via a predetermined bus. The controller I/F (interface) 36, the video I/F 37, the external memory I/F 38, the audio I/F 39, and the disk I/F 41 are respectively connected to the controller 6, the monitor 2, the external memory card 5, the speakers 2a, and the disk drive 40.

The GPU 32 performs image processing based on an instruction from the CPU 30. The GPU includes a semiconductor chip for performing calculation processing necessary for displaying 3D graphics, for example. The GPU 32 performs the image processing by using a memory (not shown) dedicated for image processing and a portion of a storage area of the main memory 33. Through using such memories, the GPU 32 generates game image data to be displayed on the monitor 2, and appropriately outputs the generated data to the monitor 2 via the memory controller 31 and the video I/F 37.

The main memory 33 is a storage area used by the CPU 30 and appropriately stores a game program, game data, or the like necessary for processing performed by the CPU 30. For example, the main memory 33 stores a game program read out from the optical disk 4 by the CPU 30, various types of data, or the like. The game program, various types of data, or the like stored in the main memory 33 are executed by the CPU 30.

The DSP 34 processes sound data or the like generated by the CPU 30 during the execution of the game program. The DSP 34 is connected to the ARAM 35 for storing the generated sound data or the like. The ARAM 35 is used when the DSP 34 performs predetermined processing (for example, storage of the game program or sound data already read out). The DSP 34 reads out the sound data stored in the ARAM 35 and outputs the sound data to speakers 2a included in the monitor 2 via the memory controller 31 and the audio I/F 39.

The memory controller 31 comprehensively controls data transfer, and is connected to the above-described various I/Fs. The controller I/F 36 includes, for example, four controller I/Fs 36a, 36b, 36c, and 36d, and communicably connects the game apparatus 3 to an external device which is engageable via connectors of the controller I/Fs 36a through 36d. For example, the controller 6 is engaged with such a connecter and is connected to the game apparatus 3 via the controller I/F 36. The monitor 2 is connected to the video I/F 37. The external memory I/F 38 is connected to the external memory card 5 and is accessible to a backup memory or the like provided in the external memory card 5. To the audio I/F 39, the speakers 2a built in the monitor 2 are connected, enabling sound data read out from the ARAM 35 by the DSP 34 or sound data directly outputted from the disk drive 40 to be outputted from the speakers 2a. The disk drive 40 is connected to the disk I/F 41. The disk drive 40 reads out data stored at a predetermined reading position of the optical disk 4 and outputs to the bus of the game apparatus 3 or the audio I/F 39.

Note that the game program of the present invention may not only be supplied to the game apparatus 3 via an external storage medium such as the optical disk 4 or the like, but also be supplied via a wired or a wireless communication line. Also, the game program may be previously stored in a nonvolatile storage apparatus inside the game apparatus 3. The information storage medium storing the game program is not limited to a CD-ROM, a DVD, or one of storage media of an optical disk type, and may be a nonvolatile semiconductor memory.

The main memory 33 appropriately stores a game program, such as described above, necessary for the process of the CPU 30. The main memory 33 includes a game program, various types of data, and the like read out from the optical disk 4 by the CPU 30. Hereinafter, with reference to FIG. 3, described is an example of data stored in the main memory 33 when a game program of the present invention is executed. Note that FIG. 3 is an outline of a memory map for illustrating the example of data stored in the main memory 33.

Figure 3:
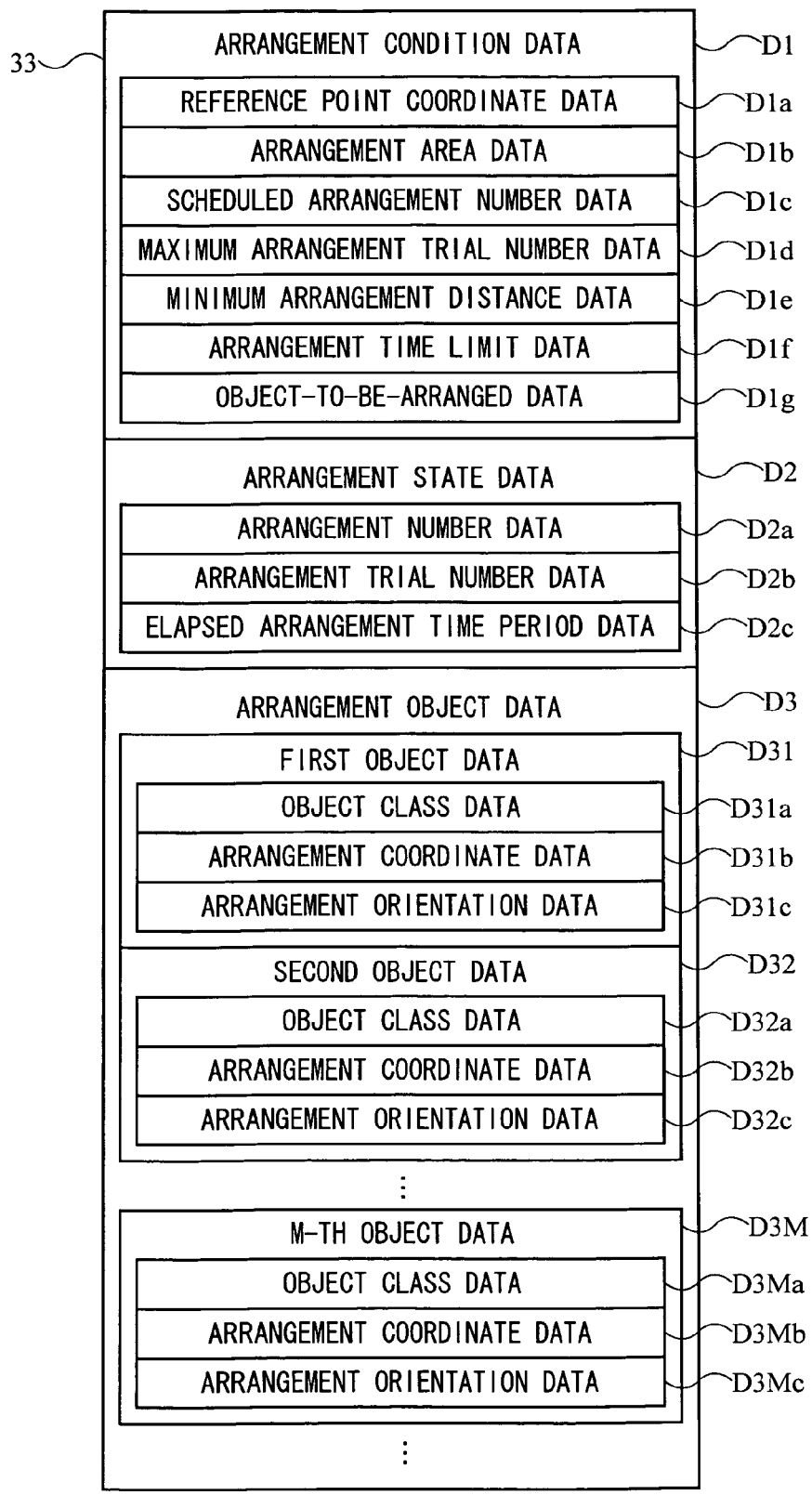
FIG. 3 is an outline of a memory map for illustrating an example of data stored in a main memory 33 of FIG. 2.

The main memory 33 has a program storage area and a data storage area, but FIG. 3 shows only the data storage area used in an operation for an object arrangement in an embodiment of the present invention. Specifically, the data storage area of the main memory 33 generally stores arrangement condition data D1, arrangement state data D2, arrangement object data D3, and the like.

The arrangement condition data D1 indicates conditions for arranging a plurality of objects. The arrangement condition data D1 includes reference point coordinate data D1$a$, arrangement area data D1$b$, scheduled arrangement number data D1$c$, maximum arrangement trial number data D1$d$, minimum arrangement distance data D1$e$, arrangement time limit data D1$f$, object-to-be-arranged data D1$g$, and the like. The reference point coordinate data D1$a$ is coordinate data of a reference point when an object is arranged in a virtual game world, and the reference point is a reference position in an area where the object is arranged and is defined by three dimensional game space coordinates on a game field, for example. Hereinafter, an area where an object is allowed to be arranged is referred to as an "arrangement area". The arrangement area data D1$b$ indicates an area used when objects are arranged in a virtual game world. Example of such an arrangement area is a circle area, with a predetermined radius, whose center is the above-described reference point. The scheduled arrangement number data D1$c$ indicates the maximum number (a scheduled arrangement number Nmax) of objects to be arranged in the arrangement area. The maximum arrangement trial number data D1$d$ indicates, when an object is to be arranged in the arrangement area, a maximum number (a maximum arrangement trial number Smax) of times a position of the object is allowed to be changed until arrangement conditions are met. The minimum arrangement distance data D1$e$ indicates a minimum distance (a minimum arrangement distance Lmin) between arranged objects. The arrangement time limit data D1$f$ indicates a time limit (an arrangement time limit Tmax; an example thereof is a time period of one frame) during which an operation of arranging objects is continued. The object-to-be-arranged data D1$g$ indicates various types of objects to be selected for arrangement.

The arrangement state data D2 includes arrangement number data D2$a$, arrangement trial number data D2$b$, elapsed arrangement time period data D2$c$, and the like. The arrangement state data D2 indicates an arrangement state appropriately updated each time an arrangement of an object occurs. The arrangement number data D2$a$ indicates the number of objects (an arrangement number N) whose arrangements are completed when a plurality of objects are arranged. The arrangement trial number data D2$b$ indicates the number of position changes (the arrangement trial number S) made in arranging a selected object in the arrangement area. The elapsed arrangement time period data D2$c$ indicates a time period elapsed (an elapsed arrangement time period T) in arranging objects.

The arrangement object data D3 indicates an object arranged in a virtual game world, and, for arranged objects, first object data D31, second object data D32, and soon until M-th object data D3M are respectively set. The object data D31 through D3M respectively includes object class data D31$a$ through D3M$a$, arrangement coordinate data D31$b$ through D3M$b$, arrangement orientation data D31$c$ through D3M$c$, and the like. Objects are classified into a class based on a type, a size, or the like, and the object class data D31$a$ through D3M$a$ each indicates a class of an object to be arranged. The arrangement coordinate data D31$b$ through D3M$b$ each indicates a position of an object arranged in the virtual game world and is defined by three dimensional game space coordinates, on a game field, of the center of the object, for example. The arrangement orientation data D31$c$ through D3M$c$ each indicates an orientation of an object arranged in the virtual game world, and is defined by an angle of the arranged object with respect to a predetermined reference direction or by vector data.

Figure 4:
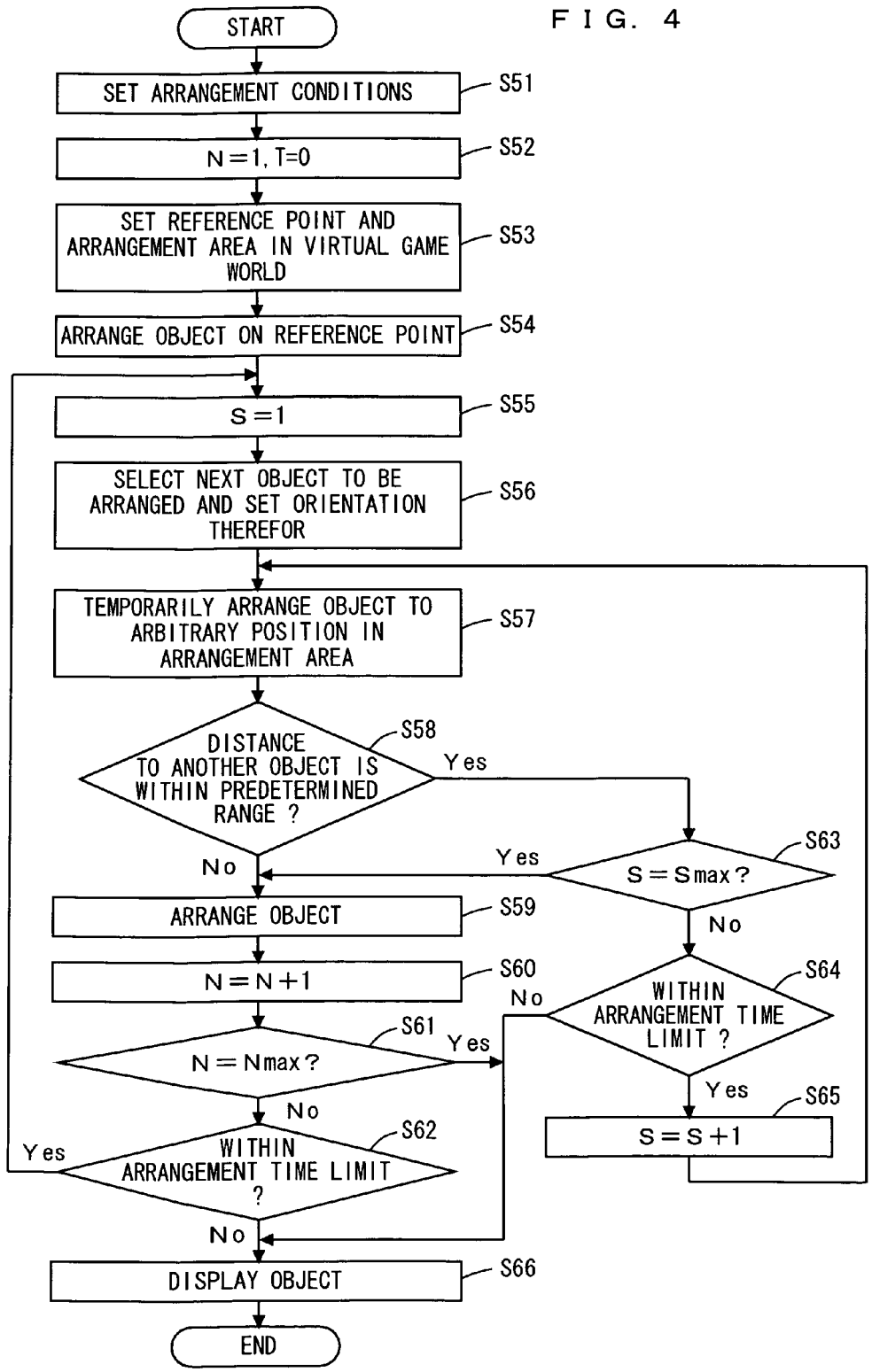
FIG. 4 is a flowchart showing a game process executed by the game apparatus 3 of FIG. 1 when an object is arranged.
Figure 5:
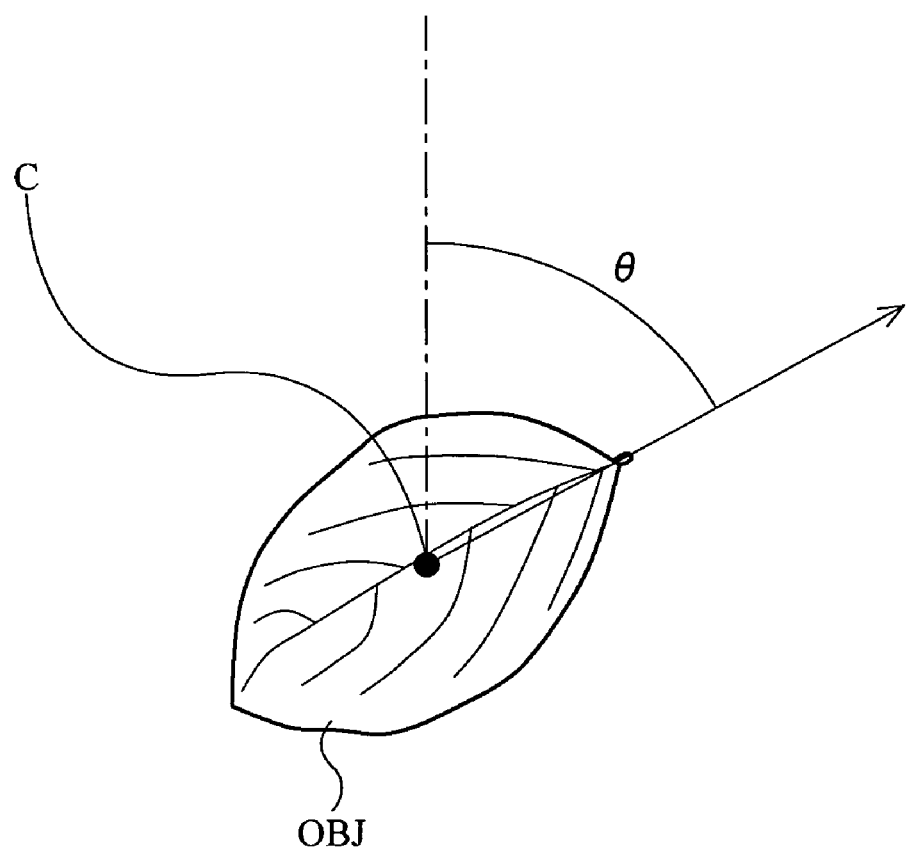
FIG. 5 is a diagram for illustrating a center and arrangement orientation $\theta$ of an object OBJ to be arranged.
Figure 6:
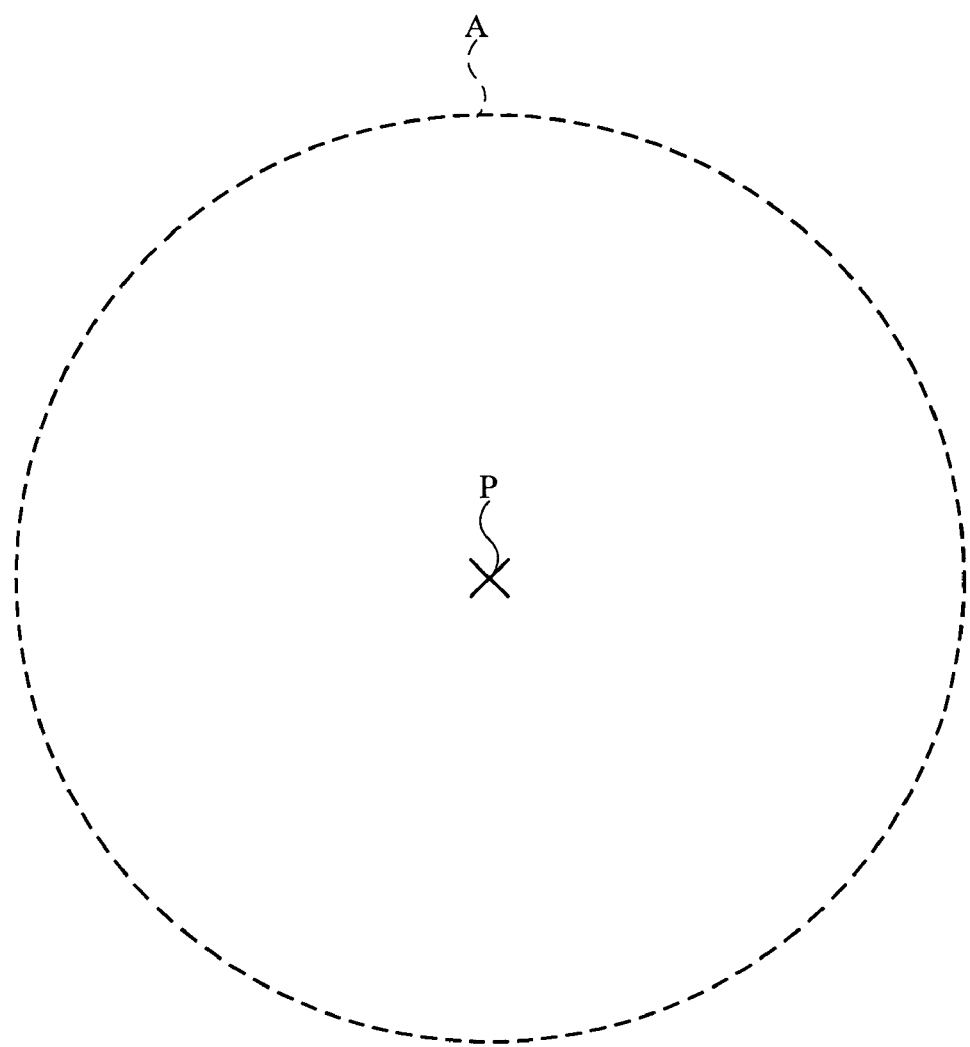
FIG. 6 is a diagram for illustrating a reference point P and an arrangement area A.
Figure 7:
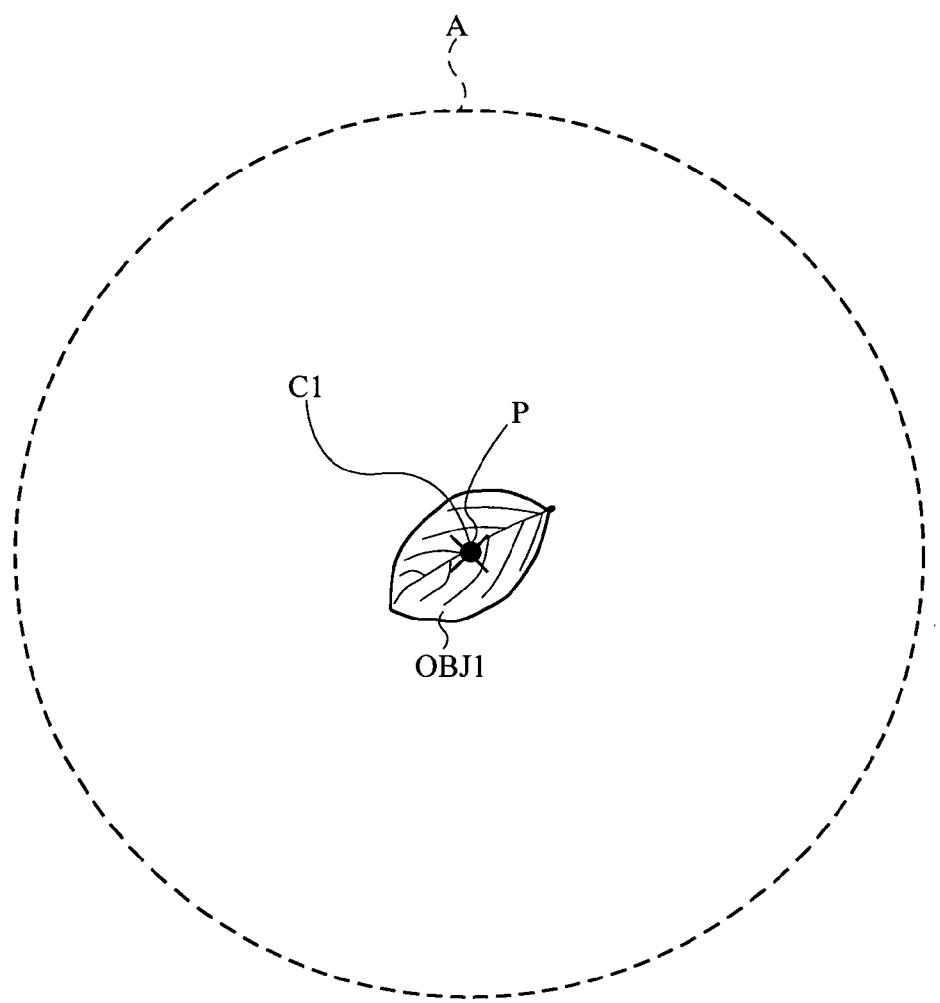
FIG. 7 is a diagram showing a state of a first object OBJ1 being arranged on the reference point P.
Figure 8:
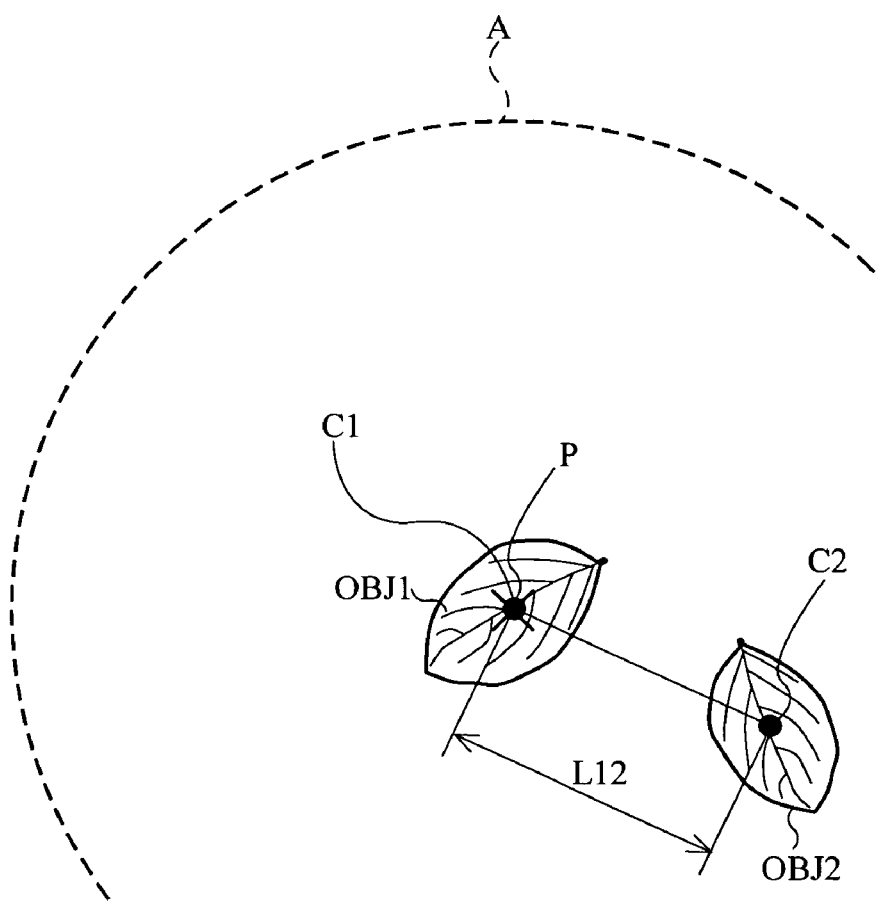
FIG. 8 is a diagram showing a distance, between the first object OBJ1 and a second object OBJ2, determined when the second object OBJ2 is arranged.
Figure 9:
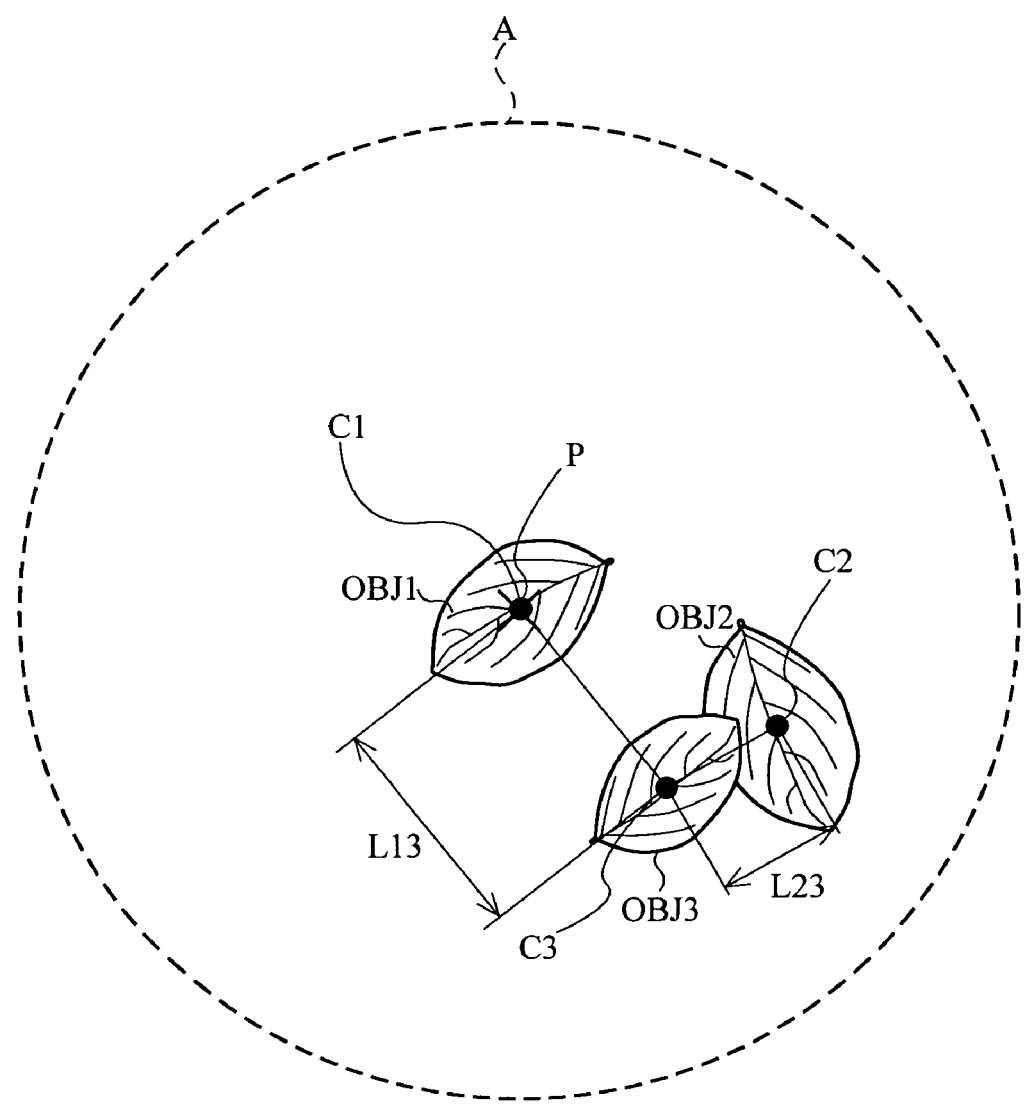
FIG. 9 is a diagram showing distances L13 and L23 determined when a third object OBJ3 is arranged, the distance L13 being a distance between the first object OBJ1 and the third object OBJ3 and the distance L23 being a distance between the second object OBJ2 and the third object OBJ3.
Figure 10:
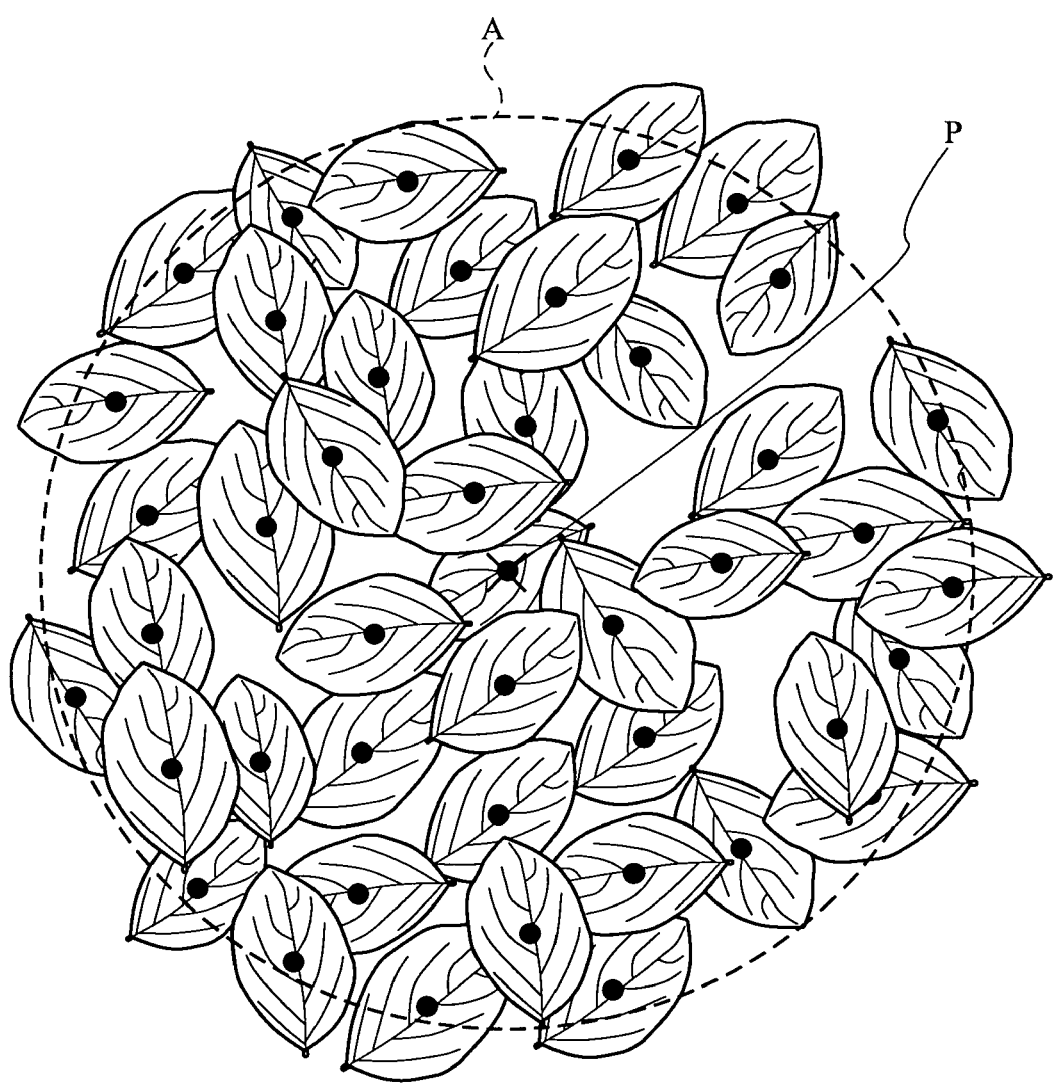
FIG. 10 is a diagram showing an example of a state in which arranging a plurality of objects OBJs is completed through the process of the flowchart of FIG. 4.

Next, with reference to FIGS. 4 to 10, a game process executed by the game apparatus 3 is described. FIG. 4 is a flowchart showing a game process executed by the game apparatus 3 when an object is arranged. FIG. 5 is a diagram for illustrating a center position C and an arrangement orientation θ of an object OBJ to be arranged. FIG. 6 is a diagram for illustrating a reference point P and an arrangement area A. FIG. 7 is a diagram showing a state of a first object OBJ1 being arranged on the reference point P. FIG. 8 is a diagram showing a distance L12, between the first object OBJ1 and a second object OBJ2, determined when the second object OBJ2 is arranged. FIG. 9 is a diagram showing distances L13 and L23 determined when a third object OBJ3 is arranged, the distance L13 being a distance between the first object OBJ1 and the third object OBJ3 and the distance L23 being a distance between the second object OBJ2 and the third object OBJ3. FIG. 10 is a diagram showing an example of a state in which arranging a plurality of objects OBJs is completed through the process of the flowchart of FIG. 4. Note that, in the flowchart shown in FIG. 4, a game process for an object arrangement is described, and a detailed description for another game process not directly relating to the present invention is omitted. In FIG. 4, each step executed by the CPU 30 is referred to with "S".

When the power to the game apparatus 3 is turned on, the CPU 30 of the game apparatus 3 executes a start program stored in the boot ROM not shown, and units such as the main memory 33 or the like are initialized. Then, a game program stored in the optical disk 4 is read into the main memory 33, and the CPU 30 executes the game program and displays a game image on the monitor 2, and thereby starting a game.

In FIG. 4, the CPU 30 sets arrangement conditions when a plurality of objects OBJs are to be arranged to predetermined positions in the virtual game world (step 51). For example, the CPU 30 sets, to the arrangement condition data D1, arrangement conditions such as positions (reference points Ps) in the virtual game world where a plurality of objects are to be arranged, an area (arrangement area A) used for arrangement, a scheduled arrangement number Nmax, a maximum arrangement trial number Smax, a minimum arrangement distance Lmin, and an arrangement time limit Tmax. Typically, in accordance with, e.g., the positions of objects to be in the virtual game world, the CPU 30 acquires previously set arrangement conditions for setting the arrangement condition data D1. Then, the CPU 30 initializes the arrangement number to be N=1 and an elapsed arrangement time period to be T=0 for updating the arrangement state data D2 (step 52). Then, the process proceeds to the next step. Note that the elapsed arrangement time period T is automatically updated as appropriate.

Next, the CPU 30 sets a reference point P and an arrangement area A in the virtual game world (e.g., on a game field) (step 53), and the process proceeds to the next step. A reference point P is set on the game field, and then a circle, with a predetermined radius, whose center is the reference point P is set as an arrangement area A, as shown in FIG. 6, for example.

Next, the CPU 30 arranges an object OBJ on the reference point P and writes the arrangement object data D3 indicating the arrangement of the object (step 54), and the process proceeds to the next step. As shown in FIG. 5, a state (position and orientation) of an object OBJ to be arranged in the virtual game world is determined by coordinates, in the virtual game world, of a center position C and an arrangement angle θ, the center position C (e.g., a center of gravity of the object OBJ)

being a reference position for the object OBJ and the arrangement angle θ being an angle for the object OBJ with respect to a predetermined reference direction. In step 54, the CPU 30 selects an object class from among selectable classes (e.g., a fallen leaf) indicated in the object-to-be-arranged data D1g, and arranges an object OBJ belonging to the selected object class such that the center position C thereof corresponds to the reference point P, as shown in FIG. 7. Then, the CPU 30 determines an arrangement angle θ of the object OBJ in, for example, a random manner. In order to distinguish the object arranged in step 54 from other objects OBJs described later, the object arranged in step 54 is referred to as a first object OBJ1 having a center position C1 been set.

Next, the CPU 30 initializes the arrangement trial number to be S=1 for updating the arrangement state data D2 (step 55). Then, the CPU 30 selects an object class from among selectable classes indicated in the object-to-be-arranged data D1g and sets (in, for example, a random manner) an arrangement angle θ of an object OBJ belonging to the selected object class (step 56), and the process proceeds to the next step.

Next, the CPU 30 temporarily arranges the object OBJ selected in step 56 to an arbitrary position in the arrangement area A (step 57). Then, the CPU 30 determines whether or not the distance between the temporarily arranged object OBJ and an object OBJ whose arrangement is completed is within a predetermined range (step 58). Specifically, the CPU 30 calculates a distance L between the center position C of the temporarily arranged object OBJ and a center position C of the object OBJ whose arrangement is completed and determines whether or not the distance L is equal to or greater than the minimum arrangement distance Lmin. Suppose a second object OBJ2 is temporarily arranged in step 57 as shown in FIG. 8. In this case, a distance L12 between the center position C1 of the first object OBJ1 and a center position C2 of the second object OBJ2 is calculated and whether or not the distance L12 is equal to or greater than the minimum arrangement distance Lmin is determined. Also, suppose a third object OBJ3 is temporarily arranged in step 57 after the first and second objects OBJ1 and OBJ2 are arranged, as shown in FIG. 9. In this case, a distance L13 between the center position C1 of the first object OBJ1 and a center position C3 of the third object OBJ3 and a distance L23 between the center position C2 of the second object OBJ2 and the center position C3 of the third object OBJ3 are calculated, and whether or not the distances L13 and L23 are equal to or greater than the minimum arrangement distance Lmin is determined. When distances Ls between all arranged objects OBJs are respectively equal to or greater than the minimum arrangement distance Lmin, the CPU 30 proceeds with the process to next step 59. On the other hand, when a distance L between a temporarily arranged object and an object OBJ whose arrangement is completed is smaller than the minimum arrangement distance Lmin, the CPU 30 proceeds with the process to next step 63.

In step 59, the CPU 30 determines that arrangement of the object OBJ temporarily arranged in the virtual game world in step 57 is to be finalized and writes the arrangement object data D3 indicating the arrangement of the object. Through step 59, arrangement of one object OBJ is finalized. Next, the CPU 30 updates the arrangement state data D2 by adding one to the arrangement number N (step 60) and determines whether or not the arrangement number N having been updated has reached a scheduled arrangement number Nmax (step 61). When the arrangement number N has not reached the scheduled arrangement number Nmax, the CPU 30 proceeds with the process to next step 62. On the other hand, when the arrangement number N has reached the scheduled arrangement number Nmax, the CPU 30 determines that arrangement of the object is performed the scheduled number of times and proceeds with the process to step 66.

In step 62, the CPU 30 determines whether or not an elapsed arrangement time period T is within an arrangement time limit Tmax. When the elapsed arrangement time period T is within the arrangement time limit Tmax, the CPU 30 returns the process back to step 55 to repeat the process. On the other hand, when the elapsed arrangement time period T has reached the arrangement time limit Tmax, the CPU 30 determines that a time limit allowed for arranging objects is passed and proceeds with the process to step 66.

When it is determined in step 58 that the distance between a position of the temporarily arranged object and an object whose arrangement is completed is smaller than the minimum arrangement distance Lmin, the CPU 30 determines whether or not the arrangement trial number S has reached a maximum arrangement trial number Smax (step 63). When the arrangement trial number S has reached the maximum arrangement trial number Smax, the CPU 30 proceeds with the process to step 59. On the other hand, when the arrangement trial number S has not reached the maximum arrangement trial number Smax, the CPU 30 proceeds with the process to next step 64.

In step 64, the CPU 30 determines whether or not the elapsed arrangement time period T is within the arrangement time limit Tmax. When the elapsed arrangement time period T is within the arrangement time limit Tmax, the CPU 30 updates the arrangement state data D2 by adding one to the arrangement trial number S (step 65) and returns the process back to step 57 to repeat the process. On the other hand, when the elapsed arrangement time period T has reached the arrangement time limit Tmax, the CPU 30 determines that the time limit allowed for arranging objects is passed and proceeds with the process to step 66.

In step 66, the CPU 30 displays, on the monitor 2, a plurality of objects OBJs whose arrangement is finalized in step 59 and whose data have been written into the arrangement object data D3, and the process of the flowchart is ended.

Here, described is a situation where it is determined that the arrangement trial number S has reached the maximum arrangement trial number Smax in step 63. As clearly shown in the flowchart of FIG. 4, when it is determined as "Yes" in step 63, temporary arrangement for the object has been performed up to the maximum arrangement trial number Smax and yet the distance between the temporarily arranged object OBJ and an object whose arrangement is completed is smaller than the minimum arrangement distance Lmin (namely, objects OBJs are closer in distance than the minimum allowed distance). When step 59 is executed subsequent to the determination of "Yes" in step 63, arrangement of the temporarily arranged object OBJ is finalized such that the distance between arranged objects is smaller than the minimum arrangement distance Lmin. In other words, after arrangement is tried the number of set times (Nmax), even when the distance between a temporarily arranged object and an object whose arrangement is completed is smaller than the minimum allowed distance, arrangement of the temporarily arranged object is finalized, though probability of this occurrence is relatively low.

Through performing the process of the above-described flowchart, a plurality of objects OBJs are arranged in the arrangement area A, as shown in FIG. 10. Specifically, random arrangement of an object OBJ is repeated within the scheduled arrangement number Nmax, the random arrangement of objects is repeated within the arrangement time limit Tmax, and, as the result of the above-described process, objects OBJs are randomly arranged with the distances therebetween being basically equal to or greater than the minimum arrangement distance Lmin. Additionally, objects OBJs in some cases are arranged such that the distances there between are smaller than the minimum arrangement distance Lmin, as described above; however, a probability of such an occurrence is low. Accordingly, while a space between arranged objects OBJs is controlled to some extent, the set number of objects OBJs can be arranged to random positions.

Here, described is setting of the arrangement condition data D1. In the minimum arrangement distance data D1e, the minimum arrangement distance Lmin is set to a large value when a space between objects OBJs is desired to be large, and, the minimum arrangement distance Lmin is set to a small value when a space between objects OBJs is desired to be small so that overlapping each other is allowed. In the maximum arrangement trial number data D1d, the maximum arrangement trial number Smax is set to a small value when it is desired to increase the number of objects OBJs whose distance to another object is smaller than the minimum arrangement distance Lmin, and the maximum arrangement trial number Smax is set to a large value when it is desired to decrease the number of objects OBJs whose distance to another object is smaller than the minimum arrangement distance Lmin. In the scheduled arrangement number data D1c, the scheduled arrangement number Nmax is set to a large value when a large number of objects OBJs are desired to be arranged in the arrangement area A, and the scheduled arrangement number Nmax is set to a small value when a small number of objects OBJs are desired to be arranged in the arrangement area A.

Accordingly, when a plurality of objects are arranged in a predetermined area, the objects are arranged in a well-balanced, random manner, whereby natural representation of the plurality of objects can be possible. For example, when a plurality of matters (e.g., floating weeds growing in crowds) which float on a predetermined area of a water surface or the like and which infrequently overlap each other in the real world are to be represented with a plurality of objects OBJs in a virtual game world, a value of the minimum arrangement distance Lmin is set such that overlapping of the objects OBJs is not allowed, and the maximum arrangement trial number Smax is set to a large value. Through setting the arrangement condition data D1 as described above, for example, floating weeds growing in crowds on a water surface in an infrequently overlapping manner can be naturally represented by arranging a plurality of objects OBJs, as shown in FIG. 11.

Figure 12:
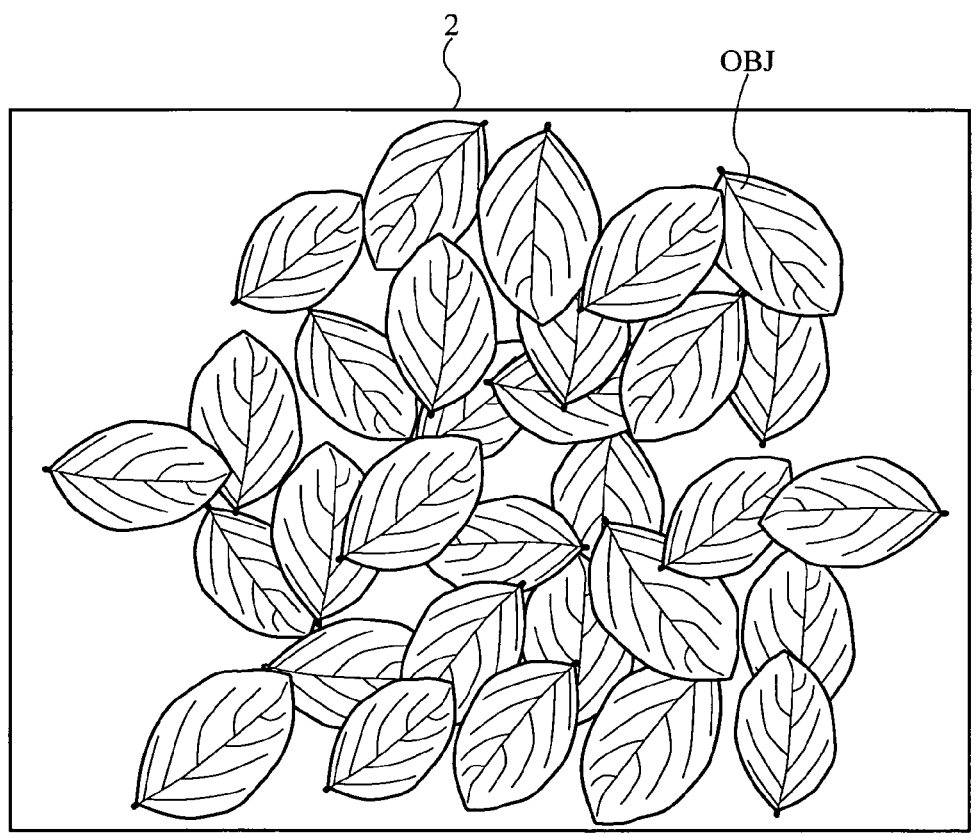
FIG. 12 is an example showing a plurality of objects OBJs being arranged to represent a state of fallen leaves which are on the ground such that the leaves overlap each other.

On the other hand, when a plurality of matters (e.g., fallen leaves around a deciduous tree) on a predetermined area of the ground in an overlapping manner in the real world are to be represented with a plurality of objects OBJs in a virtual game world, a value of the minimum arrangement distance Lmin is set such that overlapping the objects OBJs is allowed, and the maximum arrangement trial number Smax is set to a small value. Through setting the arrangement condition data D1 as described above, for example, fallen leaves overlapping each other on the ground can be naturally represented by arranging a plurality of objects OBJs, as shown in FIG. 12. In both cases, a plurality of objects are randomly arranged in a predetermined area whenever the objects are rearranged, whereby, while following a rule that each of the objects is arranged in the predetermined area, an image suitable for a game can be generated such that the objects arranged in the predetermined area appear natural.

Note that, in the above description, an arrangement area A is set on a two dimensional surface such as the ground or a water surface and a plurality of objects OBJs are arranged therein, but it is not limited thereto, and a three dimensional space may be used. For example, when an arrangement space is set in a virtual three dimensional space and objects OBJs are arranged therein in a similar manner as described above, the present invention is similarly applicable.

Also, in the above description, although an arrangement area A which is a circle area whose center is a reference point P is used for description, an arrangement area of another shape may be used. For example, an arrangement area A may be an area whose center is a reference point P and shape is a rectangle, polygon, ellipse, or a frame having an empty enclosed area. These shapes of the arrangement area A may be appropriately set in accordance with a state of a virtual game world to which arrangement is desired.

The storage medium having a game program stored therein, and the game apparatus and game processing method therefor according to the present invention can be used to arrange a plurality of objects in a virtual game world such that the objects appear natural, and are useful in representing various objects or the like appearing in a game.

While the invention has been described in detail, the foregoing description is in all aspects illustrative and not restrictive. It is understood that numerous other modifications and variations can be devised without departing from the scope of the invention.

What is claimed is:

1. A storage medium having stored therein a game program executed in a computer of a game apparatus for displaying, on a display screen, a game image showing at least a portion of a virtual game world showing a plurality of objects, the game program causing the computer to execute:

an arrangement condition setting step of setting an area for arranging the plurality of objects in the virtual game world and a minimum allowed distance between the objects to be arranged therein;

an object temporary arrangement step of changing a position of an object for temporarily arranging the object to an arbitrary position in the area set in the virtual game world until an arrangement of the object is finalized;

a distance-between-objects calculation step of calculating a distance between the object temporarily arranged in the object temporary arrangement step and an object whose arrangement in the area is completed;

an object arrangement finalization step of finalizing the arrangement of the temporarily arranged object when the distance calculated in the distance-between-objects calculation step is equal to or greater than the minimum allowed distance; and a display control step of displaying, on the display screen, a plurality of objects whose arrangement is finalized in the object arrangement finalization step.

2. The storage medium having the game program stored therein according to claim 1, wherein a maximum number for limiting a number of changes performed, in the object temporary arrangement step, for a position of the object for temporarily arranging the object is further set in the arrangement condition setting step, and, when the number of temporary arrangements performed for the object in the object temporary arrangement step reaches the maximum number, the arrangement of the temporarily arranged object is finalized in the object arrangement finalization step even when the distance calculated in the distance-between-objects calculation step is smaller than the minimum allowed distance.

3. The storage medium having the game program stored therein according to claim 1, wherein an arrangement number for limiting a number of the objects to be arranged in the area is further set in the arrangement condition setting step, and the game program causes the computer to repeatedly execute an arrangement process performed in the object temporary arrangement step, the distance-between-objects calculation step, and the object arrangement finalization step until a number of objects whose arrangements are finalized in the object arrangement finalization step reaches the arrangement number.

4. The storage medium having the game program stored therein according to claim 1, wherein a time limit for arranging the object in the area is further set in the arrangement condition setting step, and the game program causes the computer to repeatedly execute an arrangement process performed in the object temporary arrangement step, the distance-between-objects calculation step, and the object arrangement finalization step until the time limit is reached.

5. The storage medium having the game program stored therein according to claim 1, wherein, each time an arrangement of an object is finalized, the game program causes the computer to further execute an object selection step of selecting a next object to be temporarily arranged in the object temporary arrangement step from an object group having a plurality of classified classes of objects.

6. The storage medium having the game program stored therein according to claim 5, wherein an arrangement orientation for the selected object is arbitrarily set in the object selection step, and, in the object temporary arrangement step, the selected object is temporarily arranged in accordance with the arrangement orientation.

7. A game apparatus for displaying, on a display screen, a game image representing at least a portion of a virtual game world showing a plurality of objects, comprising:
　arrangement condition setting means for setting an area for arranging the plurality of objects in the virtual game world and a minimum allowed distance between the objects to be arranged therein;
　object temporary arrangement means for changing a position of an object for temporarily arranging the object to an arbitrary position in the area set in the virtual game world until an arrangement of the object is finalized;
　distance-between-objects calculation means for calculating a distance between the object temporarily arranged by the object temporary arrangement means and an object whose arrangement in the area is completed;
　object arrangement finalization means for finalizing the arrangement of the temporarily arranged object when the distance calculated by the distance-between-objects calculation means is equal to or greater than the minimum allowed distance; and
　display control means for displaying, on the display screen, a plurality of objects whose arrangement is finalized by the object arrangement finalization means.

8. The game apparatus according to claim 7, wherein the arrangement condition setting means further sets a maximum number for limiting a number of changes performed, by the object temporary arrangement means, for a position of the object for temporarily arranging the object, and
　the object arrangement finalization means finalizes, when a number of temporary arrangements performed for the object by the object temporary arrangement means reaches the maximum number, the arrangement of the temporarily arranged object is finalized even when the distance calculated in the distance-between-objects calculation means is smaller than the minimum allowed distance.

9. The game apparatus according to claim 7, wherein the arrangement condition setting means further sets an arrangement number for limiting a number of the objects to be arranged in the area, and
　the game apparatus repeatedly executes an arrangement process performed by the object temporary arrangement means, the distance-between-objects calculation means, and the object arrangement finalization means until a number of objects whose arrangements are finalized by the object arrangement finalization means reaches the arrangement number.

10. The game apparatus according to claim 7, wherein the arrangement condition setting means further sets a time limit for arranging the object in the area, and the game apparatus repeatedly executes an arrangement process performed by the object temporary arrangement means, the distance-between-objects calculation means, and the object arrangement finalization means until the time limit is reached.

11. The game apparatus according to claim 7, further comprising an object selection means for selecting, each time an arrangement of an object is finalized, a next object to be temporarily arranged by the object temporary arrangement means from an object group having a plurality of classified classes of objects.

12. The game apparatus according to claim 11, wherein the object selection means arbitrarily sets an arrangement orientation of the selected object, and the object temporary arrangement means temporarily arranges the selected object in accordance with the arrangement orientation.

13. A game processing method for displaying, on a display device screen receiving a game image generated by a game apparatus including a game computer and a storage media on which is stored a game program, the game image representing at least a portion of a virtual game world generated be the game computer showing a plurality of objects, wherein the method includes steps comprising:
　an arrangement condition setting step, performed by the game computer executing the game program by accessing the storage media, of setting an area for arranging the plurality of objects in the virtual game world and a minimum allowed distance between the objects to be arranged therein;
　an object temporary arrangement step, performed by the game computer executing the game program by accessing the storage media, of changing a position of an object for temporarily arranging the object to an arbitrary position in the area set in the virtual game world until an arrangement of the object is finalized;
　a distance-between-objects calculation step, performed by the game computer executing the game program by accessing the storage media, of calculating a distance between the object temporarily arranged in the object temporary arrangement step and an object whose arrangement in the area is completed;
　an object arrangement finalization step, performed by the game computer executing the game program by accessing the storage media, of finalizing the arrangement of the temporarily arranged object when the distance calculated in the distance-between-objects calculation step is equal to or greater than the minimum allowed distance; and
　a display control step performed by the computer displaying, on the display device screen, a plurality of objects whose arrangement is finalized, by the game computer executing the game program by accessing the storage media, in the object arrangement finalization step.

14. The game processing method according to claim 13, wherein, a maximum number for limiting a number of changes performed, in the object temporary arrangement step, for a position of the object for temporarily arranging the object is further set, by the game computer executing the game program by accessing the storable media, in the arrangement condition setting step, and, in the object arrangement finalization step, when a number of temporary arrangements performed for the object in the object temporary arrangement step reaches the maximum number, the arrangement of the temporarily arranged object is finalized, by the game computer executing the game program by accessing the storage media, even when the distance calculated in the distance-between-objects calculation step is smaller than the minimum allowed distance.

15. The game processing method according to claim 13, wherein an arrangement number for limiting a number of the objects to be arranged in the area is further set, by the game computer executing the game program by accessing the storage media, in the arrangement condition setting step, and an arrangement process performed by the game computer in the object temporary arrangement step, the distance-between-objects calculation step, and the object arrangement finalization step is repeated, by the game computer executing the game program by accessing the storage media, until a number of objects whose arrangements are finalized in the object arrangement finalization step reaches the arrangement number.

16. The game processing method according to claim 13, wherein a time limit for arranging the object in the area is further set by the game computer in the arrangement condition setting step, and an arrangement process performed in the object temporary arrangement step, the distance-between-objects calculation step, and the object arrangement finalization step is repeated, by the game computer executing the game program by accessing the storage media, until the time limit is reached.

17. The game processing method according to claim 13, further comprising an object selection step, performed by the game computer executing the game program by accessing the storage media, of selecting, each time an arrangement of an object is finalized, a next object to be temporarily arranged in the object temporary arrangement step from an object group having a plurality of classified classes of objects.

18. The game processing method according to claim 17, wherein an arrangement orientation for the selected object is arbitrarily set, by the game computer executing the game program by accessing the storage media, in the object selection step, and, in the object temporary arrangement step, the selected object is temporarily arranged in accordance with the arrangement orientation.

* * * * *